Oct. 6, 1942.  E. A. JOHNSON  2,297,771
BOX FASTENER
Filed Sept. 8, 1939
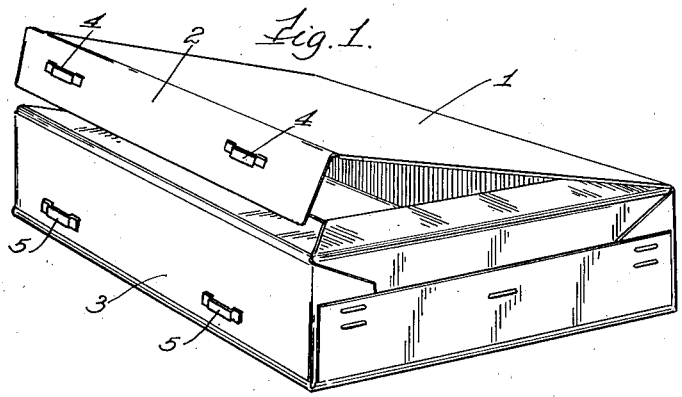
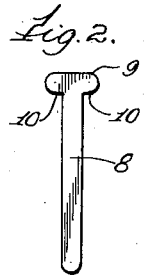
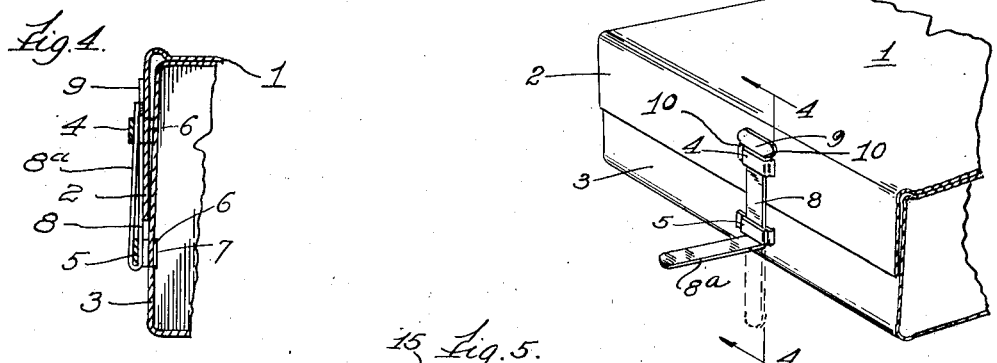
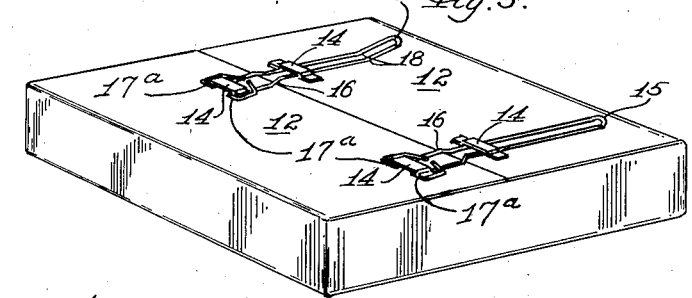
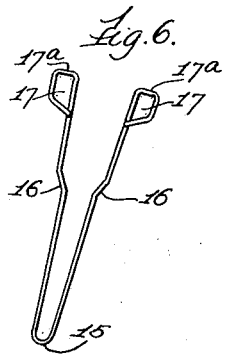
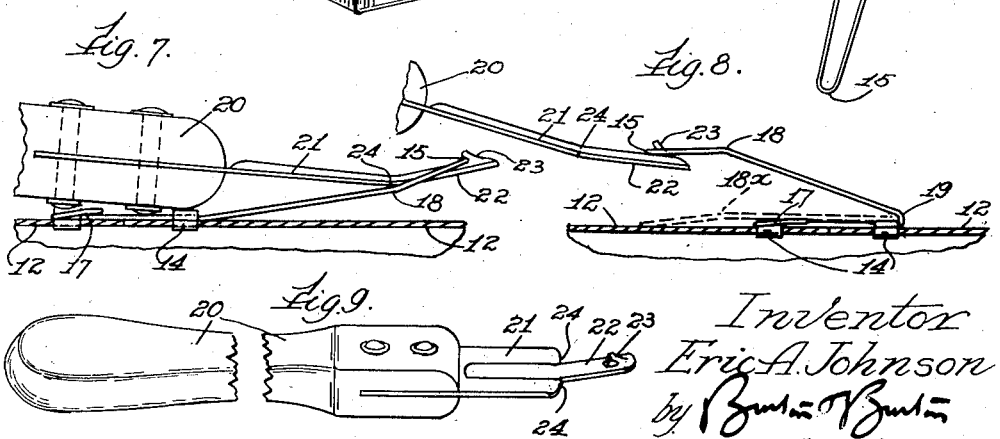
Inventor
Eric A. Johnson
by Burton & Burton
his Attorneys Patented Oct. 6, 1942

2,297,771

UNITED STATES PATENT OFFICE 2,297,771

BOX FASTENER

Eric A. Johnson, Chicago, Ill., assignor to Inland Wire Products Company, Chicago, Ill., a corporation of Illinois Application September 8, 1939, Serial No. 293,986

2 Claims. (Cl. 292—253)

This invention relates to fastening devices designed primarily for shipping cartons and boxes, and the object of the invention is to provide a fastener which shall be economical to manufacture, simple to apply and remove, and which, if desired, may be released and re-applied without loss of strength or efficiency. It is also an object of the invention to provide one form of fastener adapted for application by means of a tool. The invention consists in certain features and elements of construction in combination, as herein shown and described and as indicated by the claims.

In the drawing:

Fig. 1 is a perspective view of a box or carton fitted with staples arranged to receive fastening elements embodying this invention.

Fig. 2 is a front elevation of a sheet metal fastener adapted for use in the box of Fig. 1.

Fig. 3 is a fragmentary perspective view showing the fastener of Fig. 2 partially secured in place.

Fig. 4 is a sectional view taken as indicated at line 4—4 on Fig. 3, but showing the fastener in fully applied position.

Fig. 5 is a perspective view showing a slightly different form of carton, and showing a modified form of fastener constructed of wire and applied thereto.

Fig. 6 is a detail view of a fastener itself before application to the box.

Fig. 7 is a side elevation, partly in section, on an enlarged scale, showing the fastener of Fig. 6 in the process of application by means of a special tool.

Fig. 8 is a detail view taken similarly to Fig. 7, and showing a succeeding step in the application of the fastener.

Fig. 9 is a perspective view of the tool.

The fastening devices embodying this invention are designed for use with fairly heavy boxes or cartons of fiber or composition board because they include the use of straps or staples clinched through the material of the box and thus carrying the ultimate strain of the fastening. Obviously, however, such staples might be employed with light-weight material if suitable reinforcing patches or washers were used in connection with their anchorage in the walls of the box or carton. One example of a container to which the invention is adapted is shown in Fig. 1 as a carton of folded sheet material including a hinged cover 1 having a flap 2 which overlies one wall 3 of the box, and which in closed position occupies substantially or nearly the same plane as the part 3.

The flap 2 is fitted with staples 4, 4 and the wall 3 is fitted with similar staples 5, 5 which are shown as composed of flat strip stock, preferably of sheet metal, and which may be understood as having legs or tangs 6 whose end portions 7 are clinched against the inner faces of the box parts. The middle portions of the staples are slightly offset away from the box surfaces to provide space for the insertion of a fastener. Such a fastener is shown in Fig. 2 as formed of sheet metal, and as having a shank 8 with a transverse head portion 9 which provides shoulders 10, 10 engageable with the legs of one of the staples 4 when the fastener is inserted therethrough, as shown in Fig. 3. The shank 8 extends also through the staple 5 and is then bent back upon itself so that its terminal portion 8ª lies substantially parallel to the other portion of the shank, as indicated in Fig. 4. If this terminal portion is long enough it may be tucked under the staple 4 for final securement, and to render it less likely to catch on adjacent articles or on the clothing of workmen handling the package.

Preferably, a fastener of this character is manufactured from relatively malleable metal, so that if it becomes desirable to open the package, either for inspection or for removing a part of the contents, the tang terminal 8ª may be bent back to straight form and slipped out of the staple 5 and may be then re-inserted and again bent into holding position without breaking. However, for some uses in which it is intended that a shipment shall remain intact until finally delivered, the fastener may be made of more brittle material, which will not stand more than one bending, and which will therefore be destroyed by any attempt to remove it and re-insert it, thus furnishing a tell-tale indication that the package has been tampered with if the fasteners are not in proper condition.

Fig. 5 shows a slightly different form of carton in which the two cover members, 12, 12, are folded into closed position with their edges abutting each other so that the two members are actually in the same plane. Each cover is provided with a pair of staples, 14, 14, through which fasteners of the type shown in Fig. 2 may be inserted in the manner already described. However, Figs. 5 and 6 show a modified form of fastener composed of a length of wire bent double at 15 into a shape approximating that of a hair pin. Toward the free ends the two legs are slightly offset at 16, and the terminal portions are bent back into eyes, 17, with the extreme ends overlapping the wire stock so that when the bent end, 15, is passed through one of the staples, 14, the relatively thin material of the staple will be wedged under the overlapping end portions of the eyes, 17, and the eyes will thus snap into engagement with the staple. The transverse parts, 17ª, of the eyes, 17, form shoulders corresponding to the shoulders, 10, of the fastener of Fig. 2, in that they stop against the legs of the staple and limit insertion of the fastener. The narrower portion of the fastener adjacent the bent end, 15, will extend on through the second staple, 14, in the other cover member, 12, as shown in Fig. 5.

Then, to secure the fastener, it is bent back upon itself around the second staple. This is conveniently done by means of a tool shown in Figs. 7, 8 and 9, and comprising a handle, 20, from one end of which there extends a blade, 21, having a terminal portion, 22, of reduced width with a hook, 23, formed on its upper face near the extreme end. The narrow portion, 22, and its hook, 23, are passed between the two legs of the fastener so that the hook, 23, may engage the bent portion, 15, of the wire, as seen in Fig. 7. The initial prying action of the tool tends to bend the end portion of the fastener slightly at 18 about the shoulders, 24, of the broad blade, 21, as indicated in Fig. 7. Then, by pulling back on the tool, the wire is bent bodily at 18, about the staple, 14, so that it forms a hook engaging the staple and holding the two cover members, 12, securely together. A final tap or hammer blow of the tool at the bend, 19, will fold the fastener down to dotted position indicated at 18× in Fig. 8, so that its slightly bent end portion trends toward and into contact with the surface of the box cover 12, as shown. Preferably, the dimensions of the fastener are such that this bent end portion will extend past the staple into which the eye portions, 17, are hooked, so that the entire operation may be readily performed by means of the tool after the initial insertion of the fastener through the staples 14, 14.

The sheet metal form of fastener shown in Fig. 2 will ordinarily be applied by hand and without the aid of special tools. But, if desired, the wire type of fastener shown in Fig. 6 may be constructed of fairly heavy wire, and may be easily and rapidly applied by means of the tool just described. Either type of fastener thus provides a simple and efficient fastening by which the boxes and cartons may be rapidly closed and secured for shipment, and which, in certain forms, permits of opening the packages for inspection or partial unloading.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim:

1. A fastener for a box or carton which includes a closure member and a part in substantially the same plane as the closure, said fastener comprising a staple secured on the closure, a staple on the other part alined with the first staple, and a securing member having a shank dimensioned to extend through both staples with transverse portions forming shoulders extending to stop against the legs of one staple, the shank being of pliable material long enough to be bent back over the other staple and to overlap the staple with which said shoulders are engaged, and with its terminal portion bent at a slight angle to the adjacent portion of the shank for contact with the surface of the box.

2. A fastener for a box or carton which includes a closure member and a part in substantially the same plane as the closure, said fastener comprising a staple secured on the closure, a staple on the other part alined with the first staple, and a securing member formed of wire bent double and inserted under both staples, the end portions of said wire being bent to form eyes disposed substantially in the same plane as the remainder of the fastener and with the ends of the wire forming said eyes overlapping the adjacent portions of the wire whereby said eyes may be snapped into encircling engagement with the respective legs of one staple, the bent middle portion of the wire being pliable enough and long enough to be bent back over the other staple with its terminal portion overlapping the staple with which the eyes are engaged and extending substantially into contact with the surface of the box.

ERIC A. JOHNSON.